Patented July 24, 1934

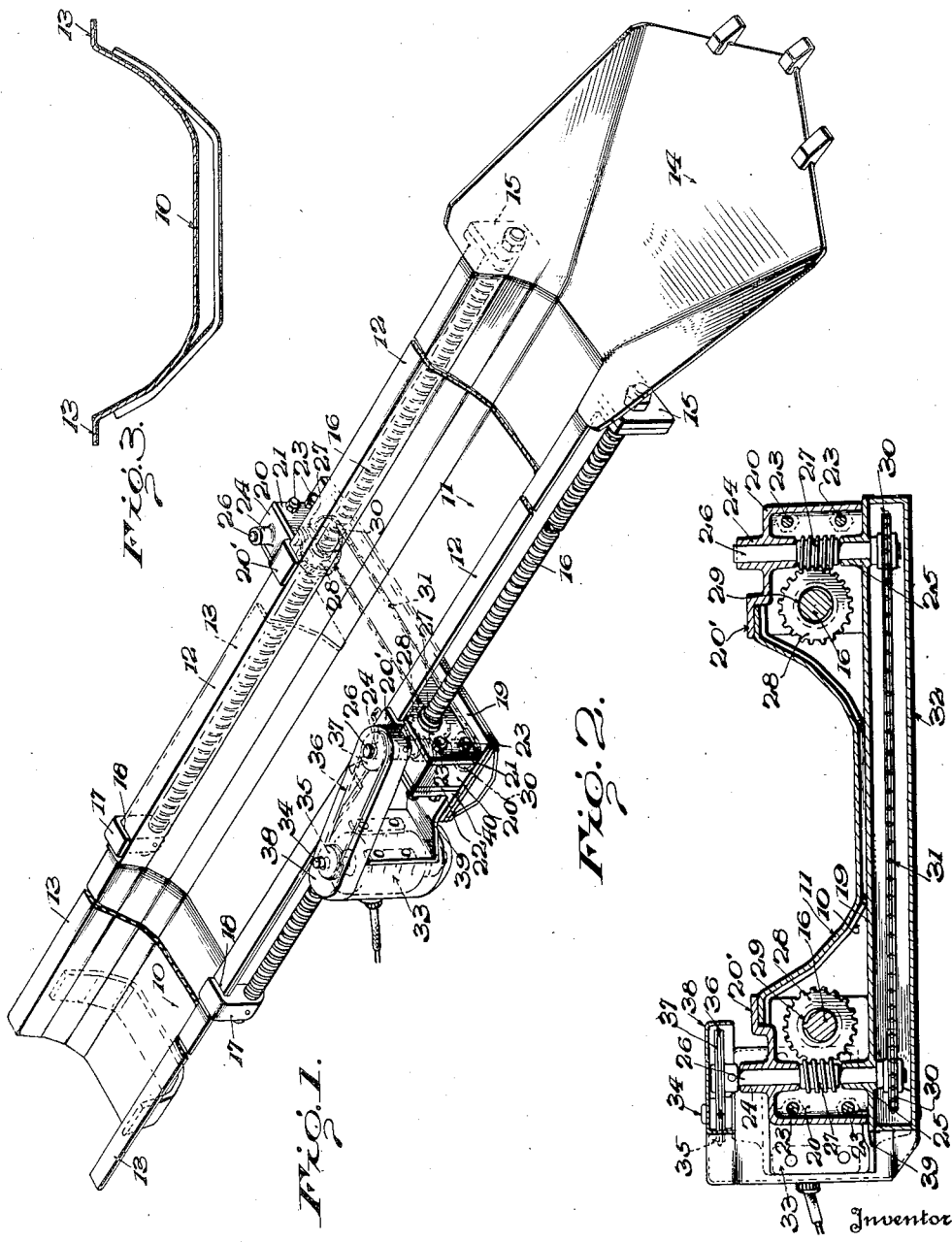

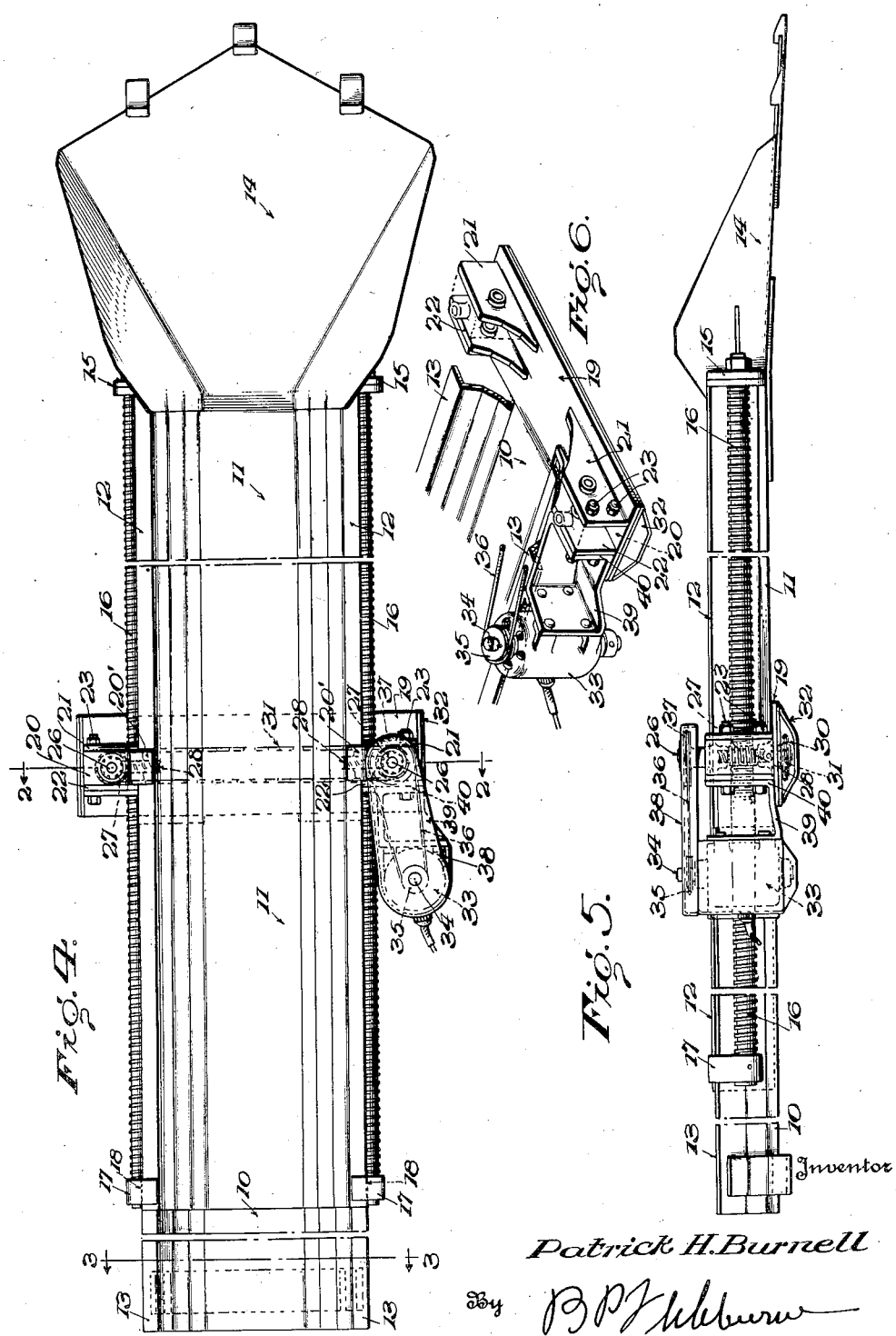

1,967,921

UNITED STATES PATENT OFFICE 1,967,921

CONVEYER

Patrick H. Burnell, Gebo, Wyo.

Application July 18, 1933, Serial No. 681,023

4 Claims. (Cl. 198—220)

My invention relates to improvements in conveyers.

An important object of my invention is to provide reliable and simple means to move the forward conveyer element longitudinally, to or from the load, which may be accomplished during the jigging or shaking action.

Other objects and advantages of the invention will be apparent during the course of the following description.

In the accompanying drawings, forming a part of this specification, and in which like numerals are employed to designate like parts throughout the same, Figure 1 is a perspective view of a conveyer embodying my invention, Figure 2 is a transverse section taken on line 2—2 of Figure 4, Figure 3 is a similar view taken through the conveyer sections, taken on line 3—3 of Figure 4, Figure 4 is a plan view of the conveyer, Figure 5 is a side elevation of the same, and, Figure 6 is a perspective view of the rear or relatively stationary conveyer section and associated elements.

In the drawings, wherein for the purpose of illustration is shown a preferred embodiment of my invention, the numeral 10 designates a rear conveyer section or chute, and 11 a companion forward conveyer section or chute arranged upon the rear conveyer section or chute and movable longitudinally with relation thereto. The rear conveyer section or chute 10 may be regarded as the relatively stationary chute. The longitudinally adjustable conveyer section or chute has generally horizontal marginal flanges 12, slidably engaging over generally horizontal marginal flanges 13 of the rear conveyer section or chute 10, as shown. The forward chute 11 has a leading end portion or shovel 14, rigidly secured thereto, as shown.

Rigidly secured to the forward end of the chute 11 is a transverse attaching member or plates 15, to which are rigidly connected longitudinally extending feed screws 16, the rear ends of which are rigidly secured to blocks 17. These blocks are rigidly attached to the top of the flanges 12 of the forward chute 11, and have notches 18 receiving the overlapping flanges 12 and 13, the blocks 17 slidably engaging the flanges 13. The feed screws 16 extend throughout the entire or major portion of the length of the forward chute, and being rigidly attached thereto, serve to stiffen and reinforce the same.

As more clearly shown in Figure 6, a transverse horizontal attaching plate or member 19 is provided, which is rigidly secured to the forward end of the chute 10 by welding, or the like. This transverse plate is positioned beneath the chute 11, and is free from connection therewith. Disposed at the ends of the plate 19 are gear cases 20. These gear cases are generally vertically disposed, and have overlapping flanges 20', slidably engaging the flanges 12. Disposed upon opposite sides of the gear cases 20 are closure plates 21 and 22, having openings 22ª formed therein for the passage of the longitudinal feed screws 16, these openings being larger in diameter than the feed screws, so that the feed screws have no screw-threaded engagement with the walls of the openings. However, since the feed screws extend through the openings 22ª, the feed screws and support including plates 19, 21 and 22, serve to limit the upward displacement of the forward chute with relation to the rear chute. These plates 21 and 22 are preferably rigidly secured to the plate 19 by welding or the like. The side plates are rigidly connected and clamped to the cases 20 by bolts 23, or the like, as shown.

The cases 20 have vertical bearings 24 and the plate 19 has vertical bearings 25, receiving vertical shafts 26, having worms 27. These worms 27 engage worm wheels 28, having screw threaded openings 29, receiving the feed screws 16. The worm wheels 28 are held between the plates 21 and 22, and cannot move longitudinally with respect to the cases, and since these worm wheels have screw threaded engagement with the feed screws 16, it is obvious that upon the rotation of the worm wheels, they will cause the feed screws 16 to move longitudinally, moving the cases 20 with them. In order that the vertical shafts 24 may turn in unison, they are provided at their lower ends and beneath the plate 19 with sprocket wheels 30, engaged by a sprocket chain 31. This sprocket chain is arranged within a housing 32, which is attached to the bottom of the plate 19, by welding or the like.

The numeral 33 designates a vertically arranged electric motor, having its armature shaft 34 disposed vertically, and driving a horizontal pulley, 35. This pulley is engaged by a belt 36, engaging a horizontal pulley 37, rigidly secured to the vertical shaft 26 to the left. The belt 36 is preferably covered by a guard 38, as shown. The motor is rigidly secured to a bracket 39, having an upstanding plate or flange 40, which is clamped to the adjacent side plate 22, by the bolts 28, as shown.

In view of the foregoing description, it will be seen that the cases 20 and plate 19 constitute a supporting structure, which is stationary with respect to the chute 10, and when the worm wheels 28 are rotated, the same turning upon the feed screws 16, effect the longitudinal travel of the feed screws, which in turn, cause the chute 11 to move longitudinally. The chute 11 may therefore, be moved forwardly or rearwardly with respect to the work by driving the motor in the desired direction.

The conveyer construction described is preferably of the jigging or shaking type, wherein the chute or chutes move the load to the point of discharge by a slow forward movement and a rapid return movement, these movements being reciprocatory. The means for thus reciprocating the chutes 10 and 11 forms no part of the present invention, and may be of any well known or preferred type. A suitable form of such means is shown in Patent No. 1,830,023, issued to R. H. Fox, November 3, 1931. The means shown in this patent for reciprocating the chute 5, including the elements 6, 7, 8, 12 and 50, may be employed to support and reciprocate the chutes 10 and 11. The means included in the present invention is adapted to longitudinally adjust the chute 12 with respect to the chute 11, and this adjustment may be effected during the reciprocating or shaking movements, if desired.

It is to be understood that the form of my invention herewith shown and described, is to be taken as the preferred example of the same, and that various changes in the shape, size and arrangement of parts may be resorted to without departing from the spirit of my invention, or the scope of the subjoined claims.

Having fully described my invention, what I claim is:

1. A conveyer comprising a rear chute, a forward chute disposed adjacent to the rear chute and movable longitudinally with relation thereto, feed screws extending longitudinally of the forward chute near its opposite sides and attached thereto for longitudinal movement therewith, gears having screw threaded engagement with the feed screws, a support attached to the rear chute and serving to hold the gears against longitudinal movement with relation to the rear chute, a motor mounted upon the support, driving means between the motor and one gear, and driving means connecting the gears so that they rotate in unison.

2. A conveyer comprising a rear chute, a forward chute disposed adjacent to the rear chute and movable longitudinally with relation thereto, feed screws extending longitudinally of the forward chute near its opposite side and attached thereto for longitudinal movement therewith, worm wheels having screw threaded engagement with the feed screw, a support attached to the forward end of the rear chute and serving to prevent the worm wheels moving longitudinally with relation to the rear chute, substantially vertical shafts carried by the support and having worms engaging the worm wheels, gearing connecting the shafts so that they turn in unison, a motor arranged near the forward end of the rear chute and mounted upon the support, and driving means between the motor and the adjacent substantially vertical shaft.

3. A conveyer comprising a rear chute, a forward chute disposed adjacent to the rear chute and movable longitudinally with relation thereto, feed screws extending longitudinally of the forward chute near its opposite sides and attached thereto for longitudinal movement therewith, a transverse housing rigidly attached to the forward end of the rear chute, worm wheels arranged within the housing and having screw threaded engagement with the feed screw, substantially vertical shafts extending into the housing and having worms engaging the worm wheels, gearing within the housing and connecting the shafts so that they operate in unison, a substantially vertical motor arranged near the housing and mounted thereon, and driving means between the motor and the adjacent substantially vertical shaft.

4. A conveyer comprising a rear chute, a forward chute disposed near the forward end of the rear chute and movable longitudinally with relation thereto, feed screws extending longitudinally of the forward chute and being arranged upon opposite sides of the forward chute and spaced therefrom, means for attaching the ends of the feed screws with the forward chute, gears mounted upon and having screw-threaded engagement with the feed screws, a support attached to the forward end portion of the rear chute and having openings formed therein for the passage of the feed screws, said support holding the gears against longitudinal movement with relation to the rear chute and also co-acting with the feed screws to limit the upward movement of the forward chute with relation to the rear chute, means to drive one gear, and driving means connecting the gears so that they turn in unison.

PATRICK H. BURNELL.